United States Patent [19]
Ruth et al.

[11] Patent Number: 6,125,980
[45] Date of Patent: Oct. 3, 2000

[54] OVERRUNNING COUPLING ASSEMBLY AND MANUFACTURING METHOD

[75] Inventors: Stephen M. Ruth, Holly; David William Shaw, Saginaw, both of Mich.

[73] Assignee: Means Industries, Inc., Saginaw, Mich.

[21] Appl. No.: 09/479,775

[22] Filed: Jan. 7, 2000

Related U.S. Application Data

[63] Continuation of application No. 09/028,904, Feb. 24, 1998, abandoned.

[51] Int. Cl.⁷ .............................. F16D 41/12; F16D 33/18
[52] U.S. Cl. .............................. 192/46; 192/69.1; 60/345; 29/428
[58] Field of Search .......................... 192/46, 45.1, 69.1, 192/3.21, 3.23, 3.34; 60/345; 188/82.7, 82.74, 82.77; 29/428, 889.5, 527.1; 264/259, 271.1

[56] References Cited

U.S. PATENT DOCUMENTS

| | | |
|---|---|---|
| 5,070,978 | 12/1991 | Pires . |
| 5,597,057 | 1/1997 | Ruth et al. ................. 192/46 |
| 5,690,202 | 11/1997 | Myers ......................... 192/46 |
| 5,829,565 | 11/1998 | Fergle et al. ............... 192/46 |
| 5,852,932 | 12/1998 | Matsumoto . |
| 5,855,263 | 1/1999 | Fergle ....................... 192/46 |
| 5,871,071 | 12/1999 | Sink . |

*Primary Examiner*—Richard M. Lorence
*Attorney, Agent, or Firm*—Brooks & Kushman P.C.

[57] ABSTRACT

A hub for a torque-transmitting member comprising a planar clutch. The clutch includes a pocket plate and a notch plate located within the hub. One plate is integrated within the hub, such as by casting or molding, to form an integral assembly, the other plate being splined or otherwise secured to a shaft. The pocket plate has strut pockets disposed about the axis of the hub. The notch plate has recesses at angularly spaced positions about the axis. Struts pivotally anchored in the strut pockets engage the notch plate recesses to effect one-way torque transfer between the plates.

10 Claims, 5 Drawing Sheets

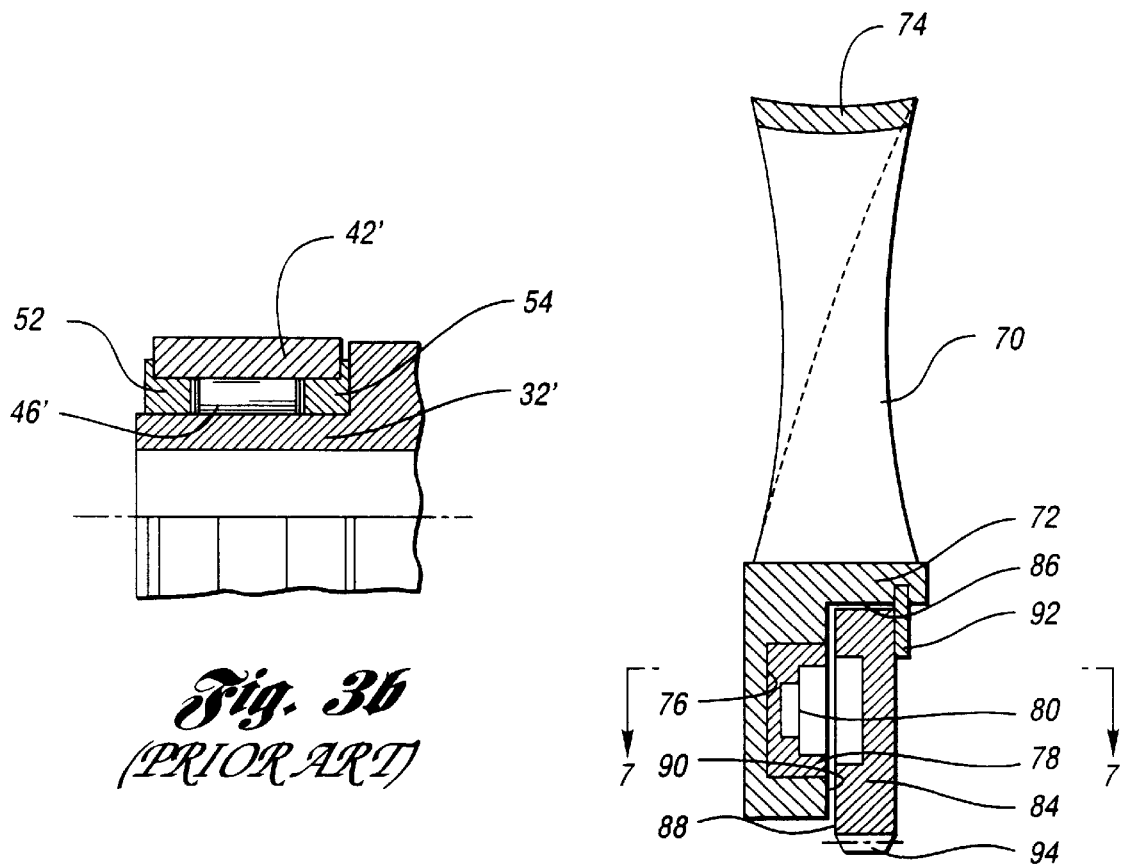
Fig. 3b (PRIOR ART)
Fig. 4
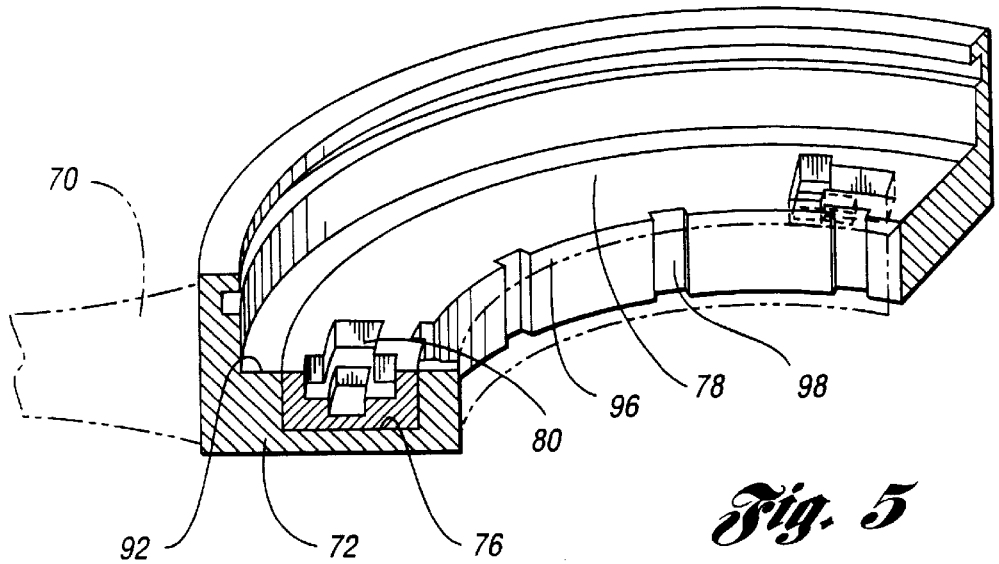
Fig. 5

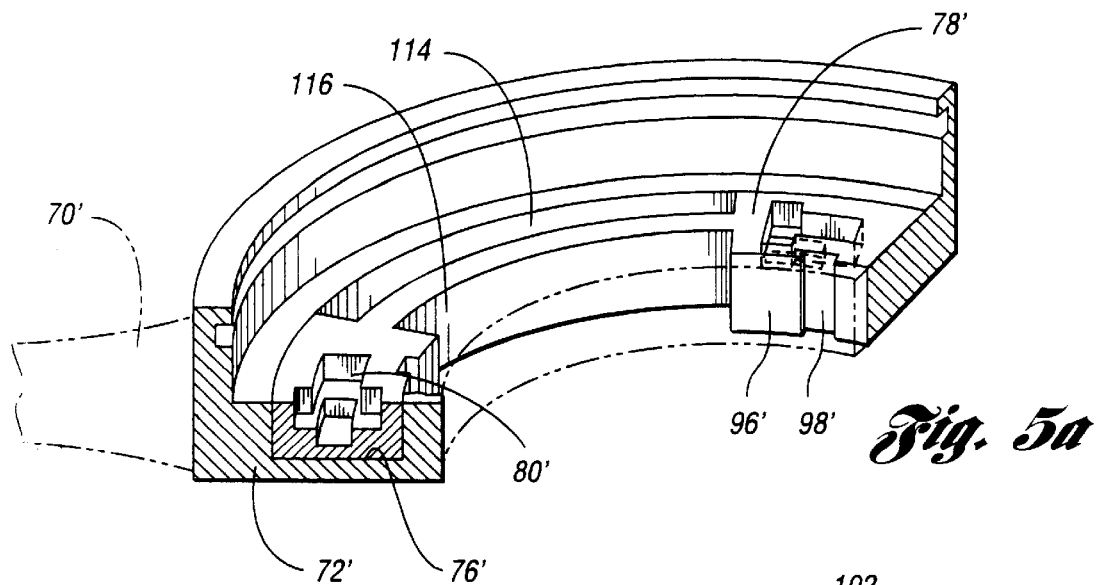
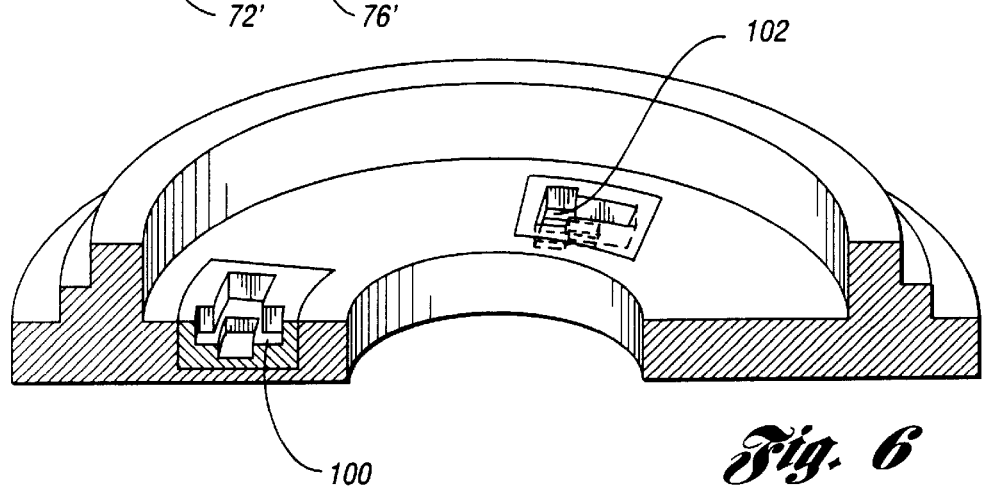
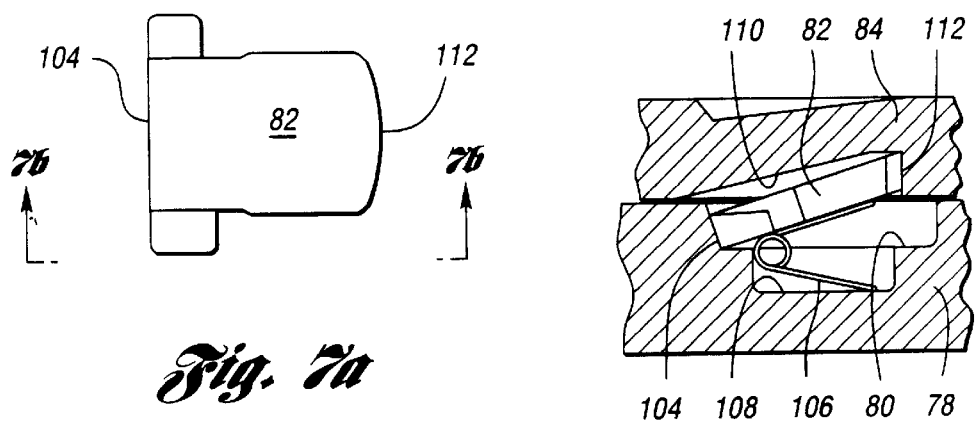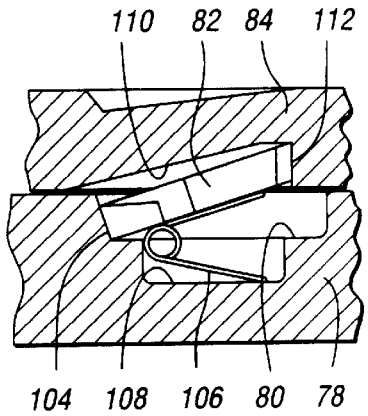

OVERRUNNING COUPLING ASSEMBLY AND MANUFACTURING METHOD

CROSS-REFERENCE TO RELATED APPLICATIONS

This application is a continuation of U.S. application Ser. No. 09/028,904, filed Feb. 24, 1998, now abandoned.

TECHNICAL FIELD

The invention relates to overrunning couplings for use in mechanisms such as power transmissions and to a method for making them.

BACKGROUND ART

The improvements of the invention are adapted especially for use in stator assemblies for torque converter transmissions in an automotive vehicle drive-line. The invention may be used also in other applications, however, such as torque transfer drives and chain drives that require an overrunning coupling in a torque flow path.

Torque converter transmissions include a stator assembly having a stator hub secured to a stationary sleeve shaft and stator blades situated between a toroidal flow exit section of a hydrokinetic turbine and the toroidal flow entrance section of a hydrokinetic impeller. The blades of the stator change the direction of the tangential component of the toroidal flow velocity vector at the turbine exit section prior to entry of the toroidal flow to the impeller entrance section. This permits multiplication of torque as the hydrokinetic converter delivers engine power to a power input element of multiple ratio gearing in the transmission mechanism.

It is known practice in the automotive transmission art to design the stator assembly of a hydrokinetic torque converter transmission with a stator hub that is adapted to receive an overrunning coupling having an outer race and an inner race, the inner race being splined to a stationary sleeve shaft and the outer race being carried by the bladed section of the stator assembly. The outer race typically would be cammed to provide a plurality of cam surfaces that are engageable by overrunning coupling rollers. The overrunning coupling permits reaction torque delivery from the stator blades to the stationary sleeve shaft when the torque converter is in a torque multiplication mode. The rollers and the cam surfaces with which they interact will permit freewheeling motion of the bladed section of the converter when the torque converter is in a coupling mode.

The outer race of a conventional overrunning stator coupling is keyed or splined in a central opening in the stator hub. It is held in place by snap rings located in snap ring grooves machined in the stator hub.

Prior art stator constructions for hydrokinetic torque converters typically are made of aluminum alloy or a phenolic resin. They are formed in a die cast operation or an injection molding operation wherein the inner and outer shrouds of the stator blades and one end wall of a stator hub comprise a unitary casting or molding. Such constructions require the formation of a keyway or internal spline tooth space in the stator hub. The outer race of an overrunning coupling, which is located in the stator hub, has a cooperating key or spline tooth arrangement to permit the overrunning coupling outer race to be locked in the stator hub. In the alternative, the keyway or spline tooth spaces may be formed in the coupling outer race and a cooperating key or spline tooth arrangement may be formed in the hub. The overrunning coupling assemblies in such arrangements are held in place by a spacer that is secured within the converter hub and held in place by a snap ring or the like.

Such prior art designs typically lack economy of space because they have an undesirable axial length. They also require a relatively large number of parts and machining operations during manufacture. Further, they require retainer rings or the like with retainer grooves that require finished machining operations on the stator hub.

While embodiments of the invention will be illustrated and described it is anticipated that various modifications and alternative designs may be made without departing from the scope of the invention.

DISCLOSURE OF INVENTION

The improvements of the invention include features that are common to features described in copending patent application Ser. No. 08/871,192, filed Jun. 9, 1997, now U.S. Pat. No. 5,918,715, issued Jul. 6, 1999, entitled "Overrunning Planar Coupling Assembly", which is owned by the assignee of the present invention and which is incorporated by reference. The stator hub comprises an aluminum alloy casting or a phenolic molding. The hub and stator blade assembly is formed by a die casting operation or an injecting molding operation. The term "casting", when used in this description, should be construed to include a molding.

The coupling assembly of the invention may be used in a variety of applications, including torque converter stators. For purposes of disclosing one embodiment of the invention, a torque converter stator coupling will be described. The invention is not limited, however, to torque converter designs.

It is an object of the invention to provide a pocket plate portion of a planar coupling assembly that is cast or molded into a stator hub so that it forms an integral part of the stator hub. The pocket plate preferably may be formed of powdered metal, which is adaptable to simplified and cost-efficient casting operations. Strut pockets are formed during the powdered metal casting procedure for the pocket plate.

It is a further object of the invention to provide a notch plate situated within the stator hub directly adjacent the pocket plate so that it may be held in place by a retainer ring or the like during an assembly operation. It too may be made of powdered metal. The stator hub is rotatable relative to the notch plate. The inner margin of the notch plate has internal spline teeth that engage external splines formed on a stationary stator torque shaft.

The pockets of the pocket plate of the invention receive torque-transmitting struts, as explained in the copending patent application identified above. The struts are urged by strut springs into engagement with notches formed in the notch plate, thereby permitting torque transfer in one direction from the stator blades to the stationary sleeve shaft. Freewheeling motion of the stator blades takes place upon a torque reversal as a transition occurs between the torque converter torque multiplication mode and the coupling mode.

In carrying out the objectives of the invention, the coupling assembly may be adapted to be used with a stator hub having a central opening through which a stationary stator shaft extends. A pocket plate is-disposed in the stator hub as part of a stator assembly. A notch plate in the hub is disposed in face-to-face relationship with respect to the pocket plate.

The pocket plate has strut pockets at angularly spaced positions about the axis of the stator assembly. The notch plate has notch recesses arranged in juxtaposed relationship with respect to the strut pockets.

The torque-transmitting struts located in the strut pockets are pivotally anchored at one of their edges in the strut pockets as the other strut edges engage the companion notch recesses to permit one-way torque transfer.

In an alternative embodiment of the invention, the notch plate, rather than the pocket plate, may be formed integrally with the hub as part of a cast or molded assembly. In this instance, the pocket plate, rather than the notch plate, would be keyed or splined to a torque shaft.

In other environments and other uses of the invention that do not include torque converters, a coupling body that is not a part of a torque converter stator hub would be used to enclose the pocket plate and the notch plate.

BRIEF DESCRIPTION OF DRAWINGS

FIG. 3b shows a prior art straddle-mounted bearing design for piloting an outer race of an overrunning coupling with respect to the inner race, the latter being secured to a stationary sleeve shaft of a hydrokinetic torque converter;

FIG. 4 is a cross-sectional view corresponding generally to the cross-sectional view of FIG. 3 showing an improved overrunning coupling assembly of the invention;

FIG. 5 is an isometric view, partly in section, showing a powdered metal pocket plate molded or cast within a stator hub as part of an integral hub assembly;

FIG. 5a is an isometric view corresponding to FIG. 5 showing an alternate design for the pocket plate that forms a part of the assembly of FIG. 5;

FIG. 6 is a view similar to FIG. 5 but which illustrates a modified clutch assembly wherein the annular pocket plate is replaced by individual pocket members that are molded or cast within the torque converter stator hub as part of an integral assembly;

FIG. 7 is a cross-sectional view taken along the plane of section line 7—7 of FIG. 4 showing the details of the struts that are located in the pockets of the pocket plate;

FIG. 7a is a plan view of a strut located in each pocket of the pocket plate;

FIG. 7b is an end elevation view of the strut shown in FIG. 7a as seen from the plane of section line 7b—7b of FIG. 7a;

BEST MODE FOR CARRYING OUT THE INVENTION

Figure 1:
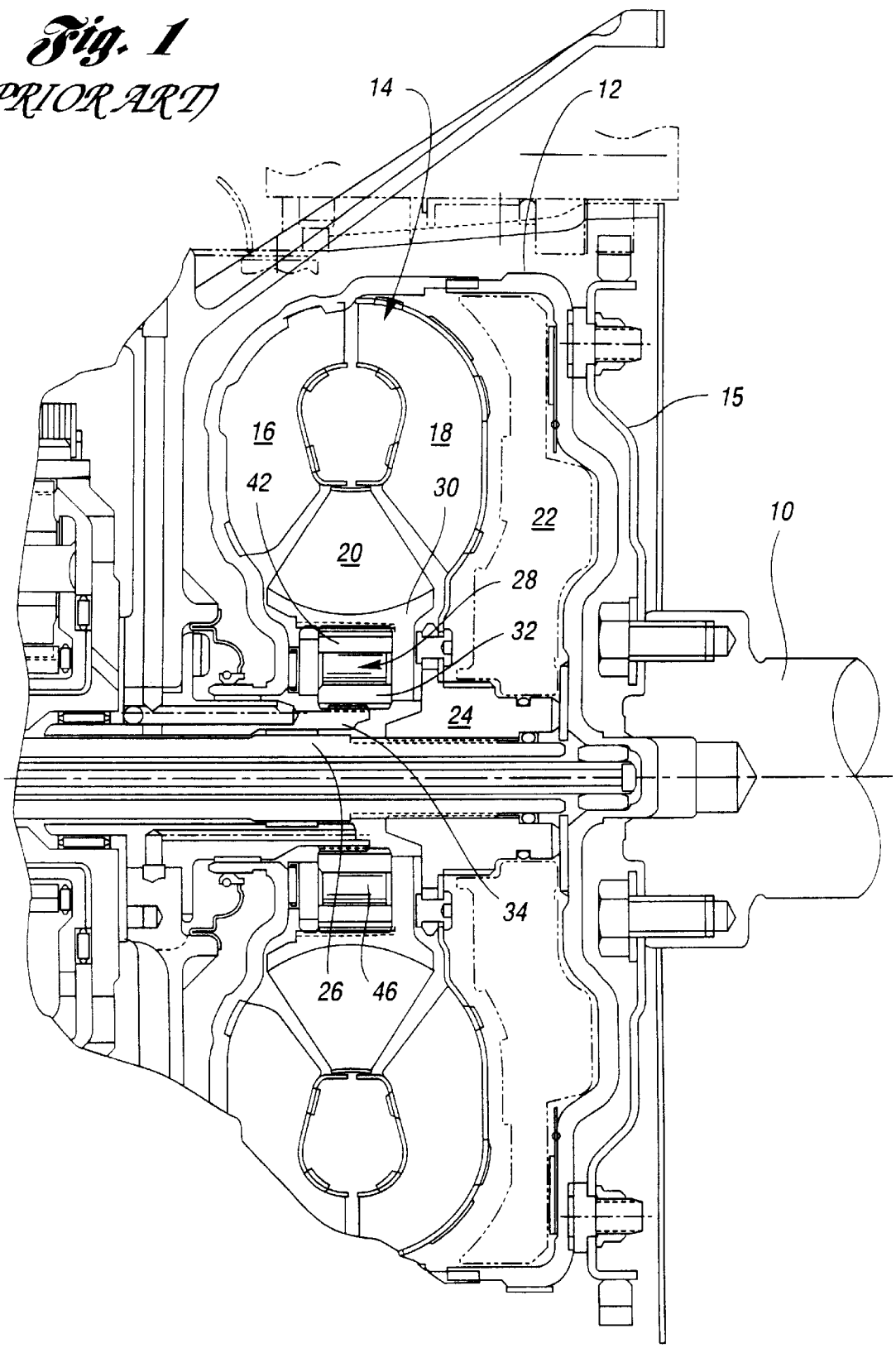
FIG. 1 shows a prior art hydrokinetic torque converter that comprises an impeller, a turbine and a stator, the stator having a stator hub with a conventional overrunning coupling.

Shown in FIG. 1 is a prior art torque converter. An engine crankshaft 10 is connected drivably to impeller shell 12 of the hydrokinetic torque converter, generally identified by reference numeral 14. This connection is provided by drive plate 15. The impeller shell forms a part of a bladed impeller 16, which is arranged in a torque converter toroidal flow circuit partly defined by turbine 18. A bladed stator 20 is situated between the flow exit section of the turbine and the flow entrance section of the impeller. A torque converter lock-up clutch, not shown, would be located as shown in phantom at 22 in FIG. 1. This clutch, when it is applied, would connect the impeller with the turbine.

Turbine 18 includes a turbine hub 24 which is splined to turbine sleeve shaft 26. The torque input elements of the planetary gearing (not shown) is connected drivably to the turbine sleeve shaft.

An overrunning coupling 28 of a conventional prior art design is disposed in the hub 30 of the stator 20. It includes an inner race 32, seen also in FIGS. 2 and 3, which is splined to a stationary stator sleeve shaft 34 secured to or formed as a part of the transmission housing.

Figure 2:
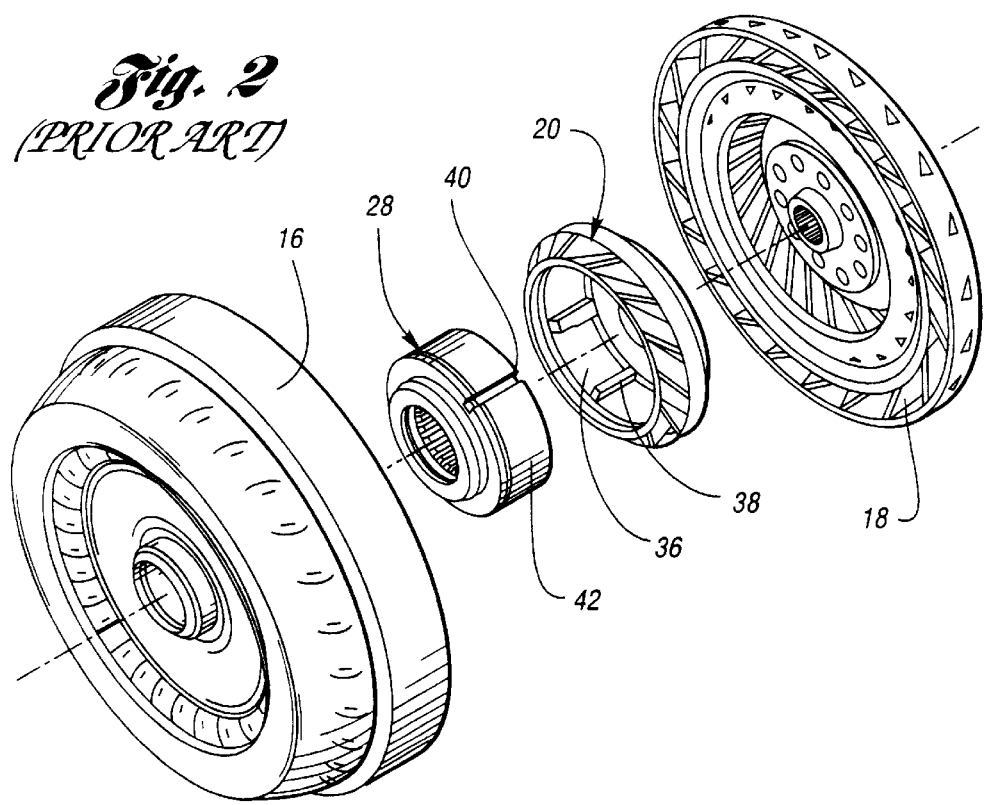
FIG. 2 is a schematic, exploded, isometric view of a stator and an overrunning coupling for a stator together with an impeller and a turbine of the kind illustrated in the torque converter cross-sectional view of FIG. 1.

FIG. 2 shows in isometric form an exploded view of the stator, the turbine and the impeller of FIG. 1. Each of these converter elements includes bladed toroidal fluid flow passages. The passages of the stator change the tangential fluid flow velocity vector as fluid leaves the flow exit section of the turbine and enters the flow entrance section of the impeller.

The stator 20 has a hub 36 which is formed with internal spline teeth or keys 38 adapted to be received in axial keyways or tooth spaces 40 in an outer race 42 for the conventional overrunning coupling 28.

Figure 3:
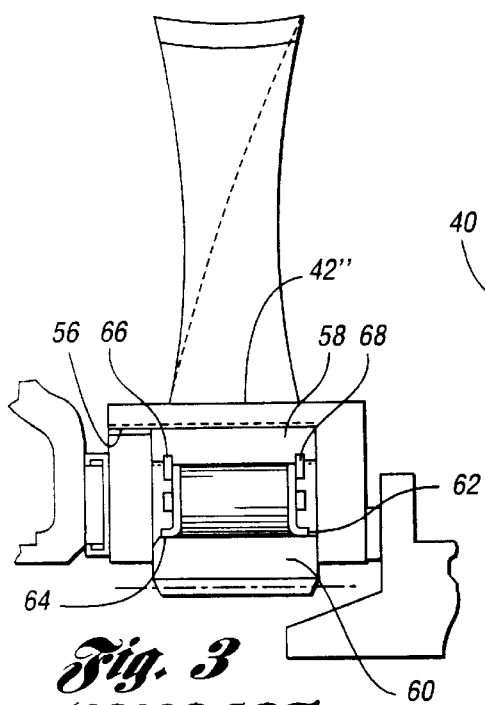
FIG. 3 is a schematic representation of a roller coupling assembly assembled in a stator hub for a torque converter of the kind illustrated in the cross-sectional view of FIG. 1.
Figure 3A:
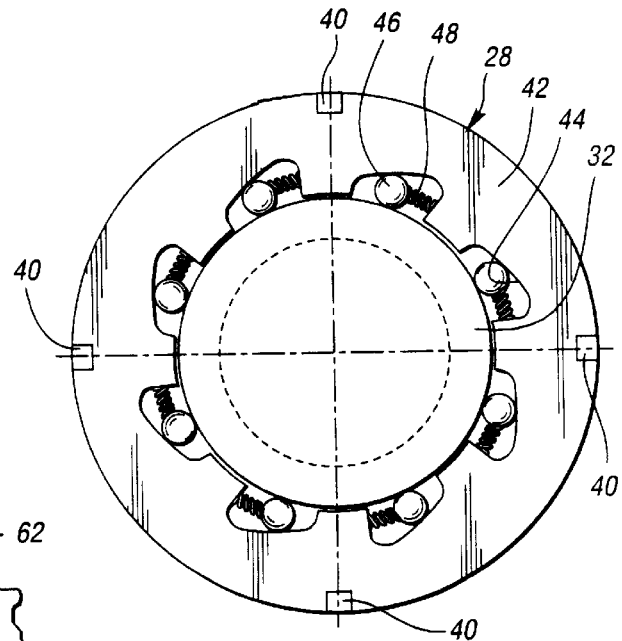
FIG. 3a is a schematic cross-sectional view of a prior art overrunning roller coupling that may be used in a torque converter hub.

As seen in the schematic view of FIG. 3a, prior art coupling 28 comprises a series of cam recesses 44 at angularly spaced locations. Each recess receives a coupling roller 46. A roller spring 48 urges each roller 46 into camming engagement with a cam surface defined by its associated recess 44 so that the rollers are in wedging engagement with the periphery of the inner race 32. Freewheeling motion of the outer race relative to the inner race thus may take place in one direction, but relative rotation is prevented by the wedging rollers when a torque reversal on the stator 20 takes place.

In the FIG. 3b schematic representation of a prior art overrunning coupling, the inner race and the outer race are represented by numerals 32' and 42', respectively, which correspond to the symbols identifying corresponding parts in FIG. 3a. Straddle bearings 52 and 54 are used to straddle mount the outer race 42' relative to the inner race 32'. Clutch rollers 46' are received in roller recesses in the outer race 42' as in the case of the schematic illustration of FIG. 3a.

FIG. 3 shows an alternate prior art construction for a bladed stator having a stator hub 42" with a central opening 56. Hub 42" may be splined or keyed to outer race 58 of a conventional overrunning roller coupling assembly. The inner race of the coupling assembly is shown at 60. The race 58 is piloted with respect to the race 60 by a cage assembly having end rings 62 and 64, which serve as pilot bearings that correspond to bearings 52 and 54 of the embodiment of FIG. 3b. Snap rings 66 and 68 hold the coupling assembly axially fast in the stator hub.

The improvement of the present invention avoids the necessity for having a large number of components as in the prior art constructions of FIGS. 2, 3, 3a and 3b. It also makes possible a reduction in the axial length of the stator hub.

The reduced number of parts in the improved stator assembly of the invention also contributes to a reduction in manufacturing costs, as well as a reduction in assembly time. It is characterized further by a significant reduction in machining operations and machining time during manufacture.

As seen in FIG. 4, the bladed stator of one embodiment of the invention includes stator blades 70 angularly spaced about the axis of stator hub 72. The blades 70, the stator shroud 74, which surrounds the outer margin of the blades, and the stator hub may be formed as a unitary casting or as a unitary molding. The same material may be used in forming the blades 70, the shroud 74 and the hub 72. The material of which the blades, the shroud and the hub are formed, for example, may be cast aluminum alloy or an injection molded phenolic.

The hub 72 of the stator assembly of the present invention, as seen in FIG. 4, has an annular recess 76. An annular pocket plate 78 is received in the recess 76, as seen at FIG. 4. The annular pocket plate 78 may be cast or molded into the stator hub 72 within the recess 76 as part of the casting operation if the material chosen for the stator assembly is cast aluminum, or as part of the injection molding operation if the material that is chosen for the stator assembly is a phenolic. The pocket plate 78 itself preferably may be a powdered metal part.

During the powdered metal casting operation for forming the pocket plate 78, pocket recesses 80, also shown in FIG. 5, are formed at angularly spaced locations. Each pocket receives a strut, generally indicated in FIGS. 7, 7a and 7b by reference numeral 82.

As shown in FIG. 4, a notch plate 84 is situated within annular opening 86 in the stator hub 72. The notch plate 84 includes an end face 88 situated in juxtaposed proximate relationship with respect to the axial face 90 of the pocket plate 78.

The stator hub 72 is rotatable relative to notch plate 84, but the notch plate 84 is held axially fast by a snap ring or other suitable retainer device, as seen at 92. Suitable clearances are provided between the stator hub 72 and the notch plate 84 and between the faces 88 and 90 of notch plate 84 and pocket plate 78, respectively.

The notch plate 84 is formed with a central opening in which are formed internal spline teeth 94. These teeth provide a splined connection with a stationary stator shaft as described with reference to FIG. 1.

Although the embodiment of the invention shown in FIG. 4 includes a pocket plate cast or molded as an integral part of the hub, it would be feasible instead to cast or mold the notch plate within the hub and to secure the pocket plate to the stationary stator shaft. The functions of the plates would be the same although their positions would be interchanged.

FIG. 5 shows an isometric view, partly in section, of a portion of the stator hub of FIG. 4. As seen in FIG. 5, the pocket plate 78 has a plurality of pockets 80 formed in the face 90. The pocket plate 78 is annular and has an internal marginal portion 96 in which is formed channels or serrations 98. When the pocket plate 78 is cast or molded into the stator hub, the channels or serrations 98 help lock the pocket plate in place to allow the pocket plate and the hub to act as a unitary, integral subassembly.

FIG. 5a shows an embodiment of the invention that has a modified annular pocket plate 78' that corresponds to the pocket plate 78 of FIG. 5. The pocket plate 78' has a reduced radial thickness at each region between two angularly spaced pocket recesses 80'. The reduced radial thickness defines arcuately shaped spaces as shown at 114 and 116. This discontinuous shape of the pocket plate 78' makes it possible to reduce the amount of material during the casting process as well as the mass of the assembly without affecting durability or performance.

FIG. 6 shows an alternate embodiment of the invention, wherein the pocket plate is replaced by a plurality of pocket members or segments 100. Each segment has formed therein a strut pocket 102 that corresponds to and that is shaped similar to the pockets 80 formed in the pocket plate 78 of FIGS. 4 and 5. As in the case of the pocket plate 78 of the embodiment shown in FIGS. 4 and 5, the pocket segments 100 of the embodiment shown in FIG. 6 preferably are formed of powdered metal (a ferrous material). They are cast or molded into the stator hub 72 during the aluminum alloy casting operation or during the injection molding operation if a phenolic is chosen as the stator assembly material.

It would be feasible to form notches in the segments rather than pockets. In that case, the pocket plate would be located adjacent the segments and secured to the stationary stator shaft rather than the notch plate.

FIG. 7, which is a partial cross-sectional view taken along the plane of section line 7—7 of FIG. 4, shows a strut 82. The struts 82 are received in pockets 80. A strut is seen in detail in FIGS. 7a and 7b. One margin 104 of the strut 82 pivotally engages one end of a pocket 80. Springs 106 located in spring recesses 108 urge the strut 82 upwardly, as seen in FIG. 7, so that each strut may enter a notch 110 formed in the notch plate 84. Each spring recess 108 forms a part of a strut pocket 80. The other margin 112 of the strut 82, as seen in FIG. 7, engages one edge of the notch 110, thereby allowing torque to be transmitted between the notch plate and the pocket plate. For a description of the operation of an overrunning planar clutch assembly of the kind shown in FIG. 7, reference may be made to the copending patent application incorporated herein by reference.

Figure 8:
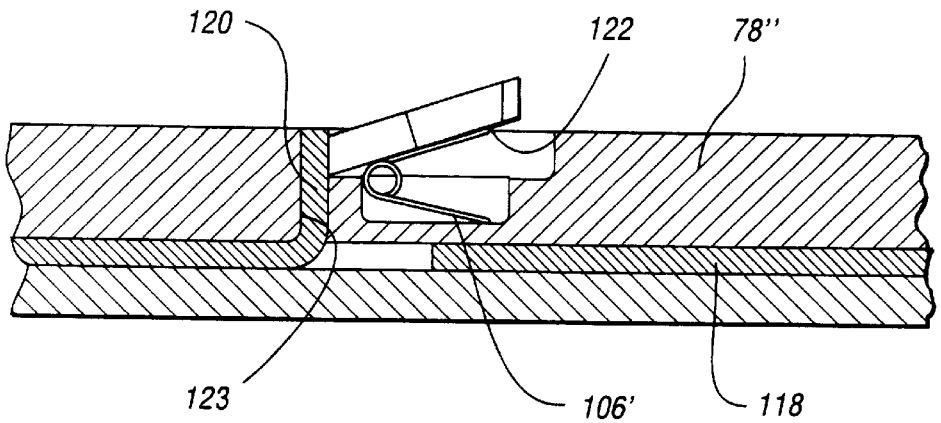
FIG. 8 is a partial cross-sectional view of a modified pocket plate design including a ring on which are formed reaction tangs for the struts.
Figure 8A:
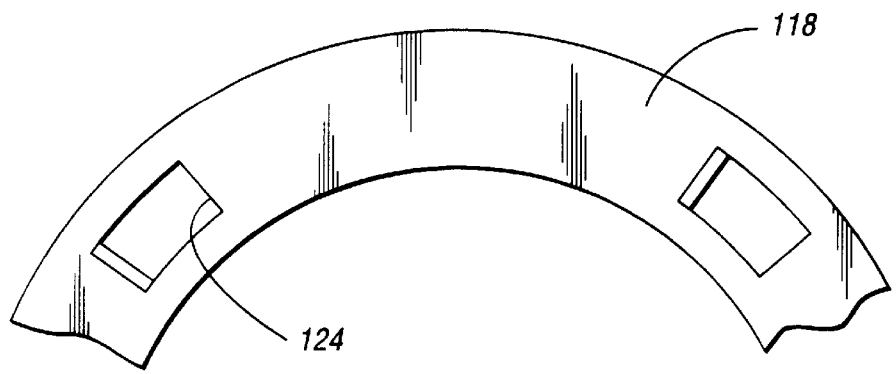
FIG. 8a is a plan view of the ring and the tangs that form a part of the assembly of FIG. 8.
Figure 9:
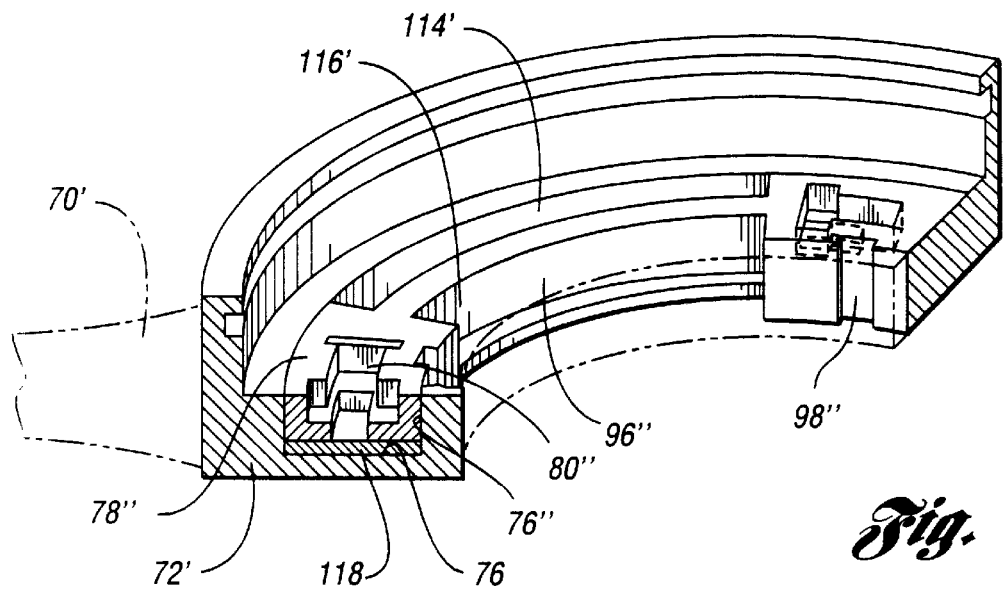
FIG. 9 is an isometric view, partly in section, showing the modified pocket plate and ring assembly of FIG. 8.

FIGS. 8, 8a and 9 show an embodiment of the invention that includes a flat ring 118 which would be located in the base of an annular recess 76", best seen in FIG. 9, formed in annular pocket plate 78", which corresponds to annular pocket plate 78' of the embodiment of FIG. 5a.

The flat ring 118, which preferably would be formed of stamped carbon steel, has a plurality of reaction shoulders or tangs 120 that preferably are punched out of the annular body of the ring 118 with a punching tool during the stamping operation for the ring 118. These tangs are spaced angularly about the axis of the pocket plate, one tang being located at one edge of each pocket 80". The pocket plate is formed with openings 123 that receive the tangs 120.

One margin of each strut 122 engages an adjacent tang 120, as best seen in FIG. 8.

A spring 106', which corresponds to spring 106 of the embodiment of FIG. 7, is located below each strut 122 to normally urge the opposite margin of the strut into engagement with a companion notch in a notch plate, not illustrated, which corresponds to notch plate 84 of the embodiment of FIG. 7.

The tangs 120, which form an integral part of the stamped ring 118, add strength and durability to the coupling assembly.

FIG. 8a, which is a plan view of the stamped ring 118 of FIG. 8, shows openings 124 that are formed in ring 118 when the tangs 120 are punched during the stamping operation.

The numerals used to identify elements of the structures seen in FIGS. 5a, 8, 8a and 9 are the same numerals used to identify corresponding elements in FIGS. 5, 7, 7a and 7b, although prime notations are added.

Although FIG. 9 shows a pocket plate corresponding to the pocket plate of FIG. 5a, a stamped ring and reaction tangs as seen in FIGS. 8, 8a and 9 can be used with a continuous annular pocket plate of the type shown at 78 in FIG. 5.

Although the invention is disclosed as part of a torque converter hub assembly, it may be used also in a gear hub or a sprocket hub where one-way torque delivery is required. Further, the invention is useful in torque delivery mechanisms other than power transmission mechanisms for automotive vehicles.

Several embodiments of the invention have been illustrated and described, but modifications to the disclosed embodiments will be apparent to persons skilled in the art. It is intended that all such modifications and all equivalents thereof will be included within the scope of the following claims.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A stator assembly comprising a non-ferrous stator hub and non-ferrous stator blades extending from said hub in a generally radial direction;

said stator hub having a central opening, a stationary stator shaft extending through said hub opening;

an annular, ferrous coupling pocket plate formed independently of said stator hub prior to assembly and integrated with said stator hub and positioned concentrically with respect to said shaft;

said ferrous pocket plate, said non-ferrous stator hub and said nonferrous stator blades having a common central axis and forming an integral unitary, cast assembly containing said pocket plate;

a notch plate in said hub disposed in face-to-face relationship with respect to said pocket plate;

said pocket plate having strut pockets disposed at angularly spaced positions about said axis;

said notch plate having notch recesses at angularly spaced positions about said axis and disposed in juxtaposed relationship with respect to said strut pockets; and torque-transmitting struts in said strut pockets pivotally anchored at one edge thereof in said pockets, a spring secured in each pocket, each spring urging a separate one of said struts toward said notch plate, the opposite edge of each strut being engageable with one of said notch recesses whereby one-way torque transfer may occur between said plates.

2. The stator assembly as set forth in claim 1 wherein said stator hub is molded with an annular recess having an axis coinciding with said central axis, said hub defining an axial end wall of said recess;

said pocket plate being molded in said annular recess and having an annular end surface;

said pocket plate and said hub having interlocking parts whereby said pocket plate is locked to said hub, thus preventing angular displacement of said pocket plate relative to said hub.

3. The stator assembly as set forth in claim 1 wherein said stator is a casting with an annular recess having an axis coinciding with said central axis, said hub defining an axial end wall of said recess;

said pocket plate being cast in said annular recess and having an annular end surface;

said pocket plate and said hub having interlocking parts, thus preventing angular displacement of said pocket plate relative to said hub.

4. A stator assembly for a hydrokinetic torque converter comprising a non-ferrous stator hub and non-ferrous stator blades extending from a stator hub axis in a generally radial direction;

said stator hub having a central opening, a stationary stator shaft in said central opening;

ferrous coupling members with radial, planar surfaces disposed in said central opening for relative angular motion, one coupling member having notch recesses in its planar surface therein and the other coupling member having strut pockets formed in its planar surface; and torque-transmitting struts in said strut pockets, said struts being pivotally engaged independently, one with respect to the other, at one of their margins on said other coupling member in said pocket, the opposite margins of said struts being engageable with said notch recesses in said one coupling member whereby torque is transmitted between said coupling members;

said non-ferrous hub, said stator blades and said other of said coupling members forming an integral, unitary, cast assembly, the one coupling member having means for anchoring it to said stator shaft;

said other coupling member being formed independently of said stator hub prior to assembly.

5. The stator assembly as set forth in claim 4 including a plurality of said strut pockets and a plurality of said notch recesses spaced angularly about said axis.

6. A method for manufacturing a stator assembly with a non-ferrous torque-transmitting hub comprising the steps of:

forming said hub with a central opening, forming ferrous coupling members having radial, planar surfaces with strut pockets and recesses, forming said non-ferrous hub and one of said ferrous coupling members as a unitary, integral, cast subassembly;

assembling struts in said pockets;

assembling a separate spring in each pocket, each spring urging a separate one of said struts toward said recesses; and assembling the other of said coupling members in said central opening with said strut pockets and recesses in close registry whereby struts in said pockets are engageable with said recesses to effect one-way torque transfer between said coupling members.

7. A method for manufacturing a stator assembly planar clutch hub comprising the steps of:

forming ferrous coupling members having radial, planar surfaces with strut pockets and recesses;

forming a non-ferrous portion of said hub as a unitary, integral, cast subassembly;

assembling struts in said pockets;

assembling a separate spring in each pocket, each spring urging a separate one of said struts toward said recesses; and assembling the other of said coupling members in said hub with said strut pockets and recesses in close registry whereby struts in said pockets are engageable with said recesses to effect one-way torque transfer between said coupling members.

8. A stator assembly comprising a non-ferrous stator hub and non-ferrous stator blades extending from said hub in a generally radial direction;

said stator hub having a central opening, a stator shaft extending through said central opening;

an annular ferrous coupling pocket plate integrated with said stator hub and positioned concentrically with respect to said shaft;

said pocket plate being formed independently of said stator hub prior to assembly;

said pocket plate, said non-ferrous stator hub and said non-ferrous stator blades having a common central axis and forming an integral, unitary, cast, assembly containing said pocket plate;

said pocket plate having strut pockets disposed at angularly spaced positions about said axis;

said hub having an annular recess that receives said pocket plate, said annular recess having a planar, radial base surface, a flat annular ring in said annular recess between said pocket plate and said radial base surface;

a notch plate having notch recesses at angularly spaced positions about said axis and disposed in juxtaposed relationship with respect to said strut pockets;

said annular ring having formed thereon reaction tangs that extend through said pocket plate adjacent said strut pockets;

torque transmitting struts in said strut pockets; a spring separately located in each pocket, each spring urging a separate strut toward said notch plate; said struts being pivotally anchored in said strut pockets at one strut edge adjacent said tangs, the opposite edge of each strut being engageable with said notch recesses whereby one-way torque transfer may occur between said plates, said annular ring reinforcing said coupling and improving durability.

9. The stator assembly as set forth in claim 8 wherein said pocket plate is formed with a reduced radial thickness at locations intermediate said angularly spaced strut pockets whereby the mass of said pocket plate is reduced without affecting durability.

10. A stator assembly comprising a non-ferrous stator hub and non-ferrous stator blades extending from said hub in a generally radial direction;

said stator hub having a central opening, a stationary stator shaft extending through said hub opening;

multiple recesses formed in said stator hub and positioned concentrically about said axis;

multiple ferrous pocket segments in said recesses, each segment having a strut pocket, the pocket segments being formed independently of said stator hub prior to assembly;

said non-ferrous stator hub, said pocket segments and said non-ferrous stator blades having a common central axis and forming an integral, unitary, cast assembly containing said pocket segments;

a notch plate in said hub with notch recesses;

said strut pockets being disposed at angularly spaced positions about said axis and in juxtaposed relationship with respect to said notch plate;

torque-transmitting struts in said strut pockets, said struts being pivotally anchored in said strut pockets at one edge thereof, the opposite edge of each strut being engageable independently, one with respect to the other, with one of said notch recesses whereby one-way torque transfer may occur between said notch plate and said pocket segments; and a spring secured in each pocket, each spring urging a separate one of said struts toward said notch plate.

* * * * *